United States Patent
Namba et al.

(10) Patent No.: US 12,104,500 B2
(45) Date of Patent: Oct. 1, 2024

(54) GAS TURBINE BLADE REPAIR METHOD

(71) Applicant: Mitsubishi Power, Ltd., Kanagawa (JP)

(72) Inventors: Katsumi Namba, Tokyo (JP); Masahiro Yamada, Tokyo (JP); Masaharu Ishida, Yokohama (JP); Ryosuke Kimura, Yokohama (JP); Rin Okayasu, Yokohama (JP); Yosuke Kawachi, Yokohama (JP); Yasuki Date, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 422 days.

(21) Appl. No.: 17/612,060

(22) PCT Filed: Apr. 20, 2020

(86) PCT No.: PCT/JP2020/017049
§ 371 (c)(1),
(2) Date: Nov. 17, 2021

(87) PCT Pub. No.: WO2020/246156
PCT Pub. Date: Dec. 10, 2020

(65) Prior Publication Data
US 2022/0243592 A1 Aug. 4, 2022

(30) Foreign Application Priority Data
Jun. 5, 2019 (JP) .................................. 2019-104960

(51) Int. Cl.
*B23P 6/00* (2006.01)
*B05D 3/10* (2006.01)
(Continued)

(52) U.S. Cl.
CPC ............. *F01D 5/005* (2013.01); *B05D 3/102* (2013.01); *B23P 6/002* (2013.01); *B23P 6/045* (2013.01);
(Continued)

(58) Field of Classification Search
CPC ........... B23P 6/007; B23P 6/002; B23P 6/045; Y10T 29/49318
See application file for complete search history.

(56) References Cited

U.S. PATENT DOCUMENTS 5,621,968 A 4/1997 Kikkawa et al.
5,972,424 A * 10/1999 Draghi .................... C23G 1/20
427/454
(Continued)

FOREIGN PATENT DOCUMENTS

CN 1737199 2/2006
EP 2 236 648 10/2010
(Continued)

OTHER PUBLICATIONS

Extended European Search Report issued Jun. 30, 2022 in corresponding European Patent Application No. 20817943.2.
(Continued)

Primary Examiner — Sarang Afzali
(74) Attorney, Agent, or Firm — Wenderoth, Lind & Ponack, L.L.P.

(57) ABSTRACT

A repair method for a gas turbine blade. The repair method include: a step of removing a thermal barrier coating to expose at least part of a base material of the gas turbine blade; a first etching step of etching the exposed base material; and a first identification step of identifying a base material deterioration layer that is harder than the base material from the etched base material. The repair method further includes a first removal step of removing the iden-
(Continued)

tified base material deterioration layer if the base material deterioration layer is identified in the first identification step; and a step of applying a thermal barrier coating to the exposed base material. The thermal barrier applying step is performed after it is determined that there is no base material deterioration layer in the first identification step, or after the base material deterioration layer is removed in the first removal step.

6 Claims, 5 Drawing Sheets

(51) Int. Cl.
  *B23P 6/04*    (2006.01)
  *C25F 3/02*    (2006.01)
  *F01D 5/00*    (2006.01)
  *F01D 5/14*    (2006.01)
  *F01D 9/02*    (2006.01)
(52) U.S. Cl.
  CPC .............. *C25F 3/02* (2013.01); *F01D 5/147* (2013.01); *F01D 9/02* (2013.01); *F05D 2220/32* (2013.01); *F05D 2230/80* (2013.01); *F05D 2240/12* (2013.01); *F05D 2240/30* (2013.01)

(56) References Cited

U.S. PATENT DOCUMENTS

| | | | |
|---|---|---|---|
| 6,328,810 B1 | 12/2001 | Conner et al. | |
| 9,102,014 B2 * | 8/2015 | Georgieva | .............. F01D 5/005 |
| 2007/0039176 A1 * | 2/2007 | Kelly | .................. C23C 28/3455 |
| | | | 29/402.09 |
| 2007/0141965 A1 | 6/2007 | Juneau et al. | |
| 2010/0247740 A1 | 9/2010 | Reitz et al. | |
| 2013/0086784 A1 | 4/2013 | Bunker | |
| 2013/0299456 A1 | 11/2013 | Kamioka | |
| 2014/0157597 A1 | 6/2014 | Connor et al. | |
| 2014/0341729 A1 | 11/2014 | Osako et al. | |
| 2018/0207689 A1 | 7/2018 | Takeuchi et al. | |

FOREIGN PATENT DOCUMENTS

| | | |
|---|---|---|
| JP | 7-229402 | 8/1995 |
| JP | 7-325069 | 12/1995 |
| JP | 2001-303903 | 10/2001 |
| JP | 2009-180649 | 8/2009 |
| JP | 2013-160619 | 8/2013 |
| JP | 2013-234358 | 11/2013 |
| WO | 2017/115643 | 7/2017 |

OTHER PUBLICATIONS

International Search Report issued on Jul. 7, 2020 in International Application No. PCT/JP2020/017049.
English translation of the International Preliminary Report on Patentability issued on Dec. 7, 2021 in corresponding International Application No. PCT/JP2020/017049 with English translation.
Office Action issued on Feb. 20, 2021 in TW Application No. 109113603.
Decision of Refusal issued on May 27, 2021 in TW Application No. 109113603.
Office Action issued Jan. 25, 2024 in counterpart CN application No. 202080037987.8.

* cited by examiner

(Cross-sectional view)

(Plan view)

FIG. 5

GAS TURBINE BLADE REPAIR METHOD

TECHNICAL FIELD

The present disclosure relates to a gas turbine blade repair method and a gas turbine blade.

BACKGROUND

Since rotor blades and stator blades of a gas turbine are used for a prolonged period at high temperature, if a thermal barrier coating disappears due to erosion or the like, the base metal of the blades is exposed, and chromium, aluminum, and titanium in the base material metal are nitrided, forming a nitride layer on the surface of the base material. The nitride layer is harder than the base material, and thus reduces ductility and causes a risk of cracking. Therefore, a repair method to remove the nitride layer is necessary.

The conventional repair method to remove the nitride layer includes hollowing out the base material, but if the formed nitride layer is not properly identified, the nitride layer may remain. Patent Document 1 describes a method of revealing the macrostructure of a structural member composed of nickel-based alloy or the like by electrolytically etching the structural material.

CITATION LIST

Patent Literature

Patent Document 1: JP2013-160619A

SUMMARY

Problems to be Solved

The use of the method described in Patent Document 1 allows one to identify a base material deterioration layer such as nitride layer or altered layer formed on the surface of the base material of gas turbine blades. However, Patent Document 1 neither describes nor suggests electrolytic etching to identify the base material deterioration layer formed on the surface of the base material of gas turbine blades, let alone removal of the base material deterioration layer.

In view of the above, an object of at least one embodiment of the present disclosure is to provide a repair method for a gas turbine blade whereby it is possible to appropriately remove a base material deterioration layer formed on the base material, and a gas turbine blade from which a base material deterioration layer formed on the base material has been appropriately removed.

Solution to the Problems

A repair method for a gas turbine blade according to at least one embodiment of the present disclosure comprises: a step of removing a thermal barrier coating to expose at least part of a base material of the gas turbine blade; a first etching step of etching the exposed base material; a first identification step of identifying a base material deterioration layer that is harder than the base material from the etched base material; a first removal step of removing the identified base material deterioration layer if the base material deterioration layer is identified in the first identification step; and a step of applying a thermal barrier coating to the exposed base material after it is determined that there is no base material deterioration layer in the first identification step, or after the base material deterioration layer is removed in the first removal step. With this configuration, by etching the base material exposed by removing the thermal barrier coating, the base material deterioration layer such as nitride layer or altered layer can be reliably identified, so that the base material deterioration layer formed on the base material can be appropriately removed.

In at least one embodiment of the present disclosure, the method may further comprise, after the step of removing the thermal barrier coating, a first measurement step of measuring a remaining thickness of the exposed base material, and the first etching step may be performed if the remaining thickness measured in the first measurement step is equal to or greater than a preset acceptable value. If the remaining thickness is less than the acceptable value, a situation may arise where the subsequent steps cannot be performed while the base material deterioration layer is being removed. In contrast, with this configuration, by measuring the remaining thickness, it is possible to determine in advance whether each step can be performed, thus preventing waste of repair.

In at least one embodiment of the present disclosure, the method may comprise, after the first removal step, repeating at least once: a second etching step of etching the base material from which the base material deterioration layer has been removed; a second identification step of identifying the base material deterioration layer from the etched base material; and a second removal step of removing the identified base material deterioration layer if the base material deterioration layer is identified in the second identification step. With this configuration, the base material deterioration layer can be reliably removed.

In at least one embodiment of the present disclosure, the method may further comprise, before the second etching step, a second measurement step of measuring a remaining thickness of the base material from which the base material deterioration layer has been removed, and the second etching step may be performed if the remaining thickness measured in the second measurement step is equal to or greater than a preset acceptable value. With this configuration, by measuring the remaining thickness, it is possible to determine in advance whether each step can be performed, thus preventing waste of repair.

In at least one embodiment of the present disclosure, the method may further comprise, after the step of removing the thermal barrier coating, a step of examining a base material deterioration layer in the base material by X-ray fluorescence. With this configuration, the presence or absence of the base material deterioration layer can be checked before etching.

A gas turbine blade according to at least one embodiment of the present disclosure comprises: a base material; and a thermal barrier coating applied to a surface of the base material. The base material has at least one recess that is concave with respect to the surface, and a depth of a deepest portion of the recess is 20 µm or more. The gas turbine blade from which the base material deterioration layer has been removed by the above-described gas turbine blade repair method has such a configuration.

In at least one embodiment of the present disclosure, the at least one recess may be configured to include a virtual circle having a diameter of 10 mm when the at least one recess is viewed as facing the surface of the base material. Further, the base material deterioration layer that is harder than the base material is not formed on the surface of the at least one recess.

Advantageous Effects

According to at least one embodiment of the present disclosure, by etching the base material exposed by removing the thermal barrier coating, the base material deterioration layer such as nitride layer or altered layer can be reliably identified, so that the base material deterioration layer formed on the base material can be appropriately removed.

DETAILED DESCRIPTION

Embodiments of the present invention will now be described in detail with reference to the accompanying drawings. However, the scope of the present invention is not limited to the following embodiments. It is intended that dimensions, materials, shapes, relative positions and the like of components described in the embodiments shall be interpreted as illustrative only and not intended to limit the scope of the present invention.

Figure 1:
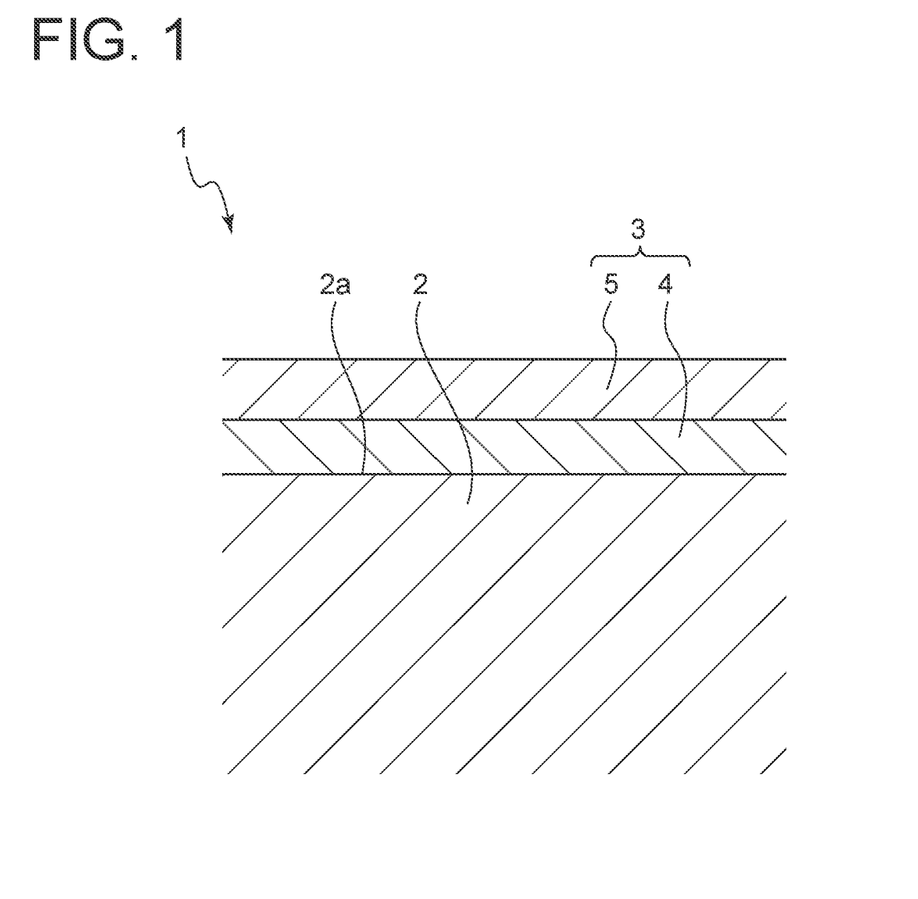
FIG. 1 is a schematic cross-sectional view of a gas turbine blade in the vicinity of the blade surface to be repaired by a gas turbine blade repair method according to an embodiment of the present disclosure.

As shown in FIG. 1, a gas turbine blade 1 has a thermal barrier coating 3 applied on a surface 2a of a base material 2. The thermal barrier coating 3 includes a bond coat layer 4 which is a metallic bond layer applied on the surface 2a of the base material 2 by thermal spraying, and a top coat layer 5 which is a ceramic layer applied on the bond coat layer 4 by thermal spraying. In the present disclosure, the blade 1 may be a rotor blade or a stator blade. Further, the type and number of stages of the gas turbine are also not limited. Further, the material of the blade 1 may be, for example, Ni-base alloy or Co-base alloy, and is not limited to any particular material.

When the thermal barrier coating 3 disappears due to erosion or other reasons during the use of the blade 1, a base material deterioration layer that is harder than the base material, such as nitride layer or altered layer, is formed on the surface 2a. Since cracks may develop from the base material deterioration layer, repair is needed to remove the base material deterioration layer. Next, the gas turbine blade repair method according to an embodiment of the present disclosure to remove the base material deterioration layer will be described based on FIG. 1 and the flowchart of FIG. 2.

Figure 2:
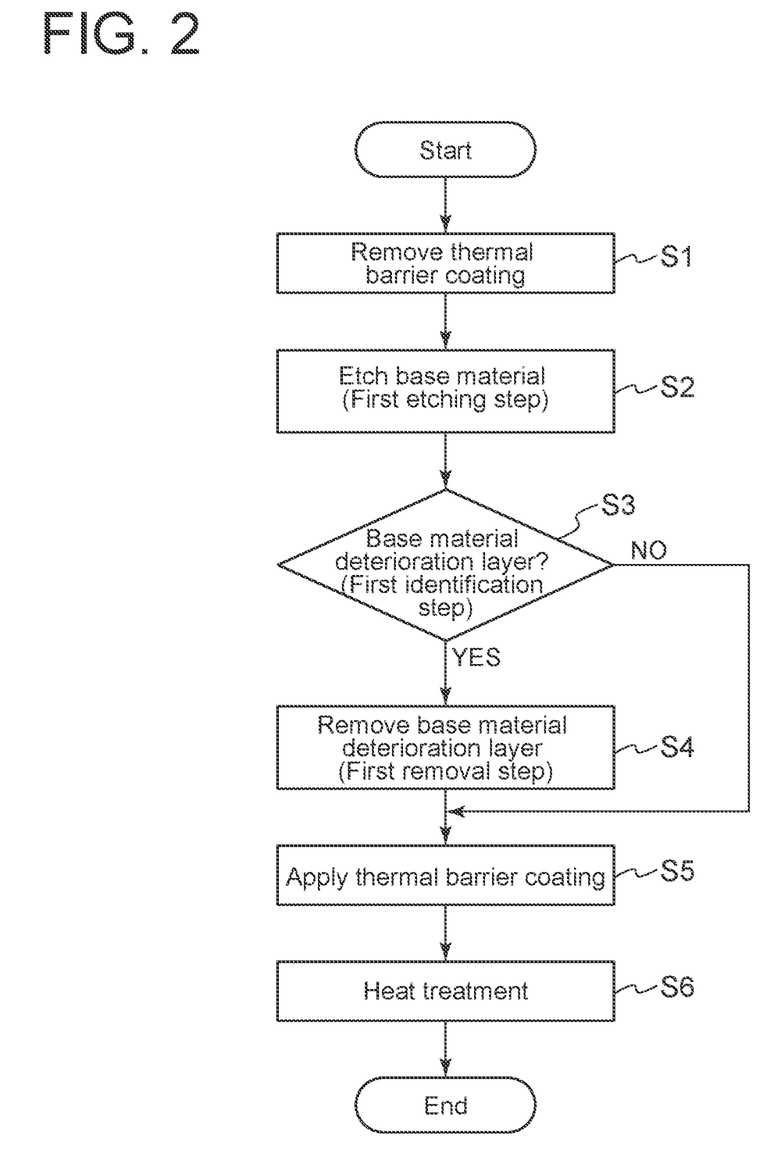
FIG. 2 is a flowchart of the gas turbine blade repair method according to an embodiment of the present disclosure.

In step S1, the thermal barrier coating 3 is removed from the surface 2a of the base material 2. In step S1, the top coat layer 5 of the upper layer is first removed, for example, by blasting. After the removal of the top coat layer 5 is completed, the bond coat layer 4 is removed, for example, by pickling.

After removing the thermal barrier coating 3 from at least part of the surface 2a of the base material 2 in step S1, the surface 2a is etched (step S2: first etching step). The method of etching the surface 2a is not limited. For example, it may be electrolytic etching, in which the base material 2 is used as the anode and another metal is used as the cathode, the two electrodes are placed opposite each other, an etchant is interposed between the two electrodes, and a voltage is applied. The conditions of electrolytic etching may be, for example, 40 to 70% nitric acid water as the etchant, voltage of 1.0 to 3.0 V, current of 0.05 to 1.0 A, and application time of 60 to 90 seconds.

Figure 3:
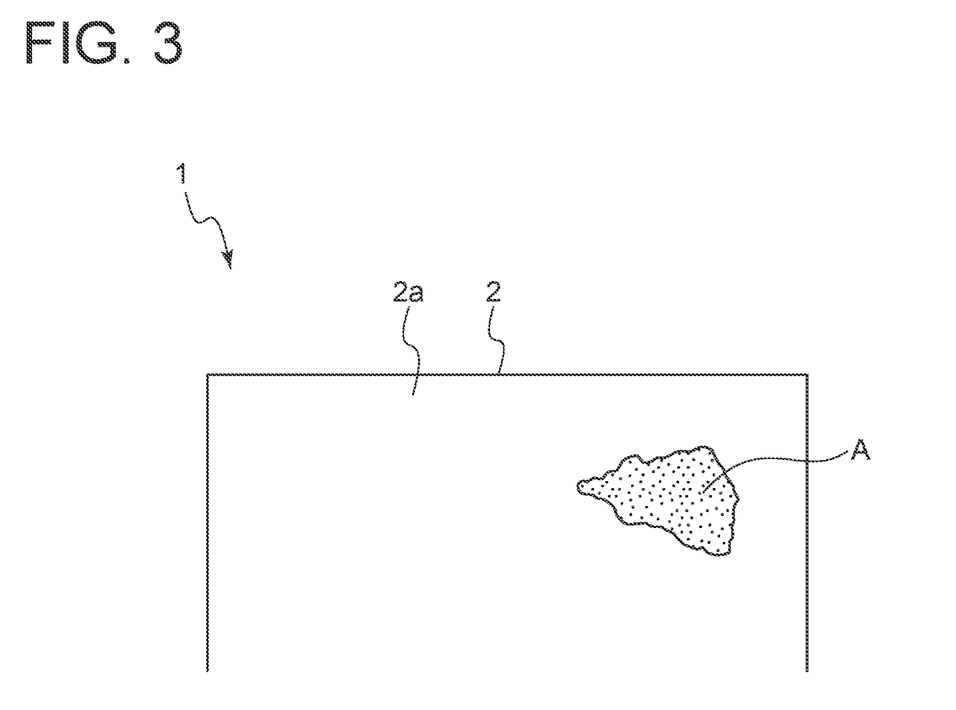
FIG. 3 is a schematic diagram showing an example of the surface of the base material etched in the gas turbine blade repair method according to an embodiment of the present disclosure.

Then, the base material deterioration layer is identified from the etched base material 2 (step S3: first identification step). As shown in FIG. 3, when the base material deterioration layer is formed on the surface 2a of the base material 2, a different color area (shaded portion A) appears on the surface 2a from the portion where the base material deterioration layer is not formed. That is, the shaded portion A corresponds to the portion where the base material deterioration layer is formed. If it is determined in step S3 that no base material deterioration layer is formed, the process moves to step S5 described below. Conversely, if it is determined in step S3 that the base material deterioration layer is formed and the location thereof is identified, this portion is removed by grinding with a grinder, for example (step S4: first removal step).

After removing the base material deterioration layer in step S3, a thermal barrier coating 3 is applied to the surface 2a of the base material 2 (step S5). Specifically, after blasting the surface 2a of the base material 2 to form microscopic unevenness, a bond coat layer 4 is applied on the surface 2a, and a top coat layer 5 is applied on the bond coat layer 4. Then, the blade 1 is subjected to diffusion heat treatment at 850° C. for a predetermined time using a heat treatment furnace (step S6), and the repair method of the present disclosure is completed.

Figure 4:
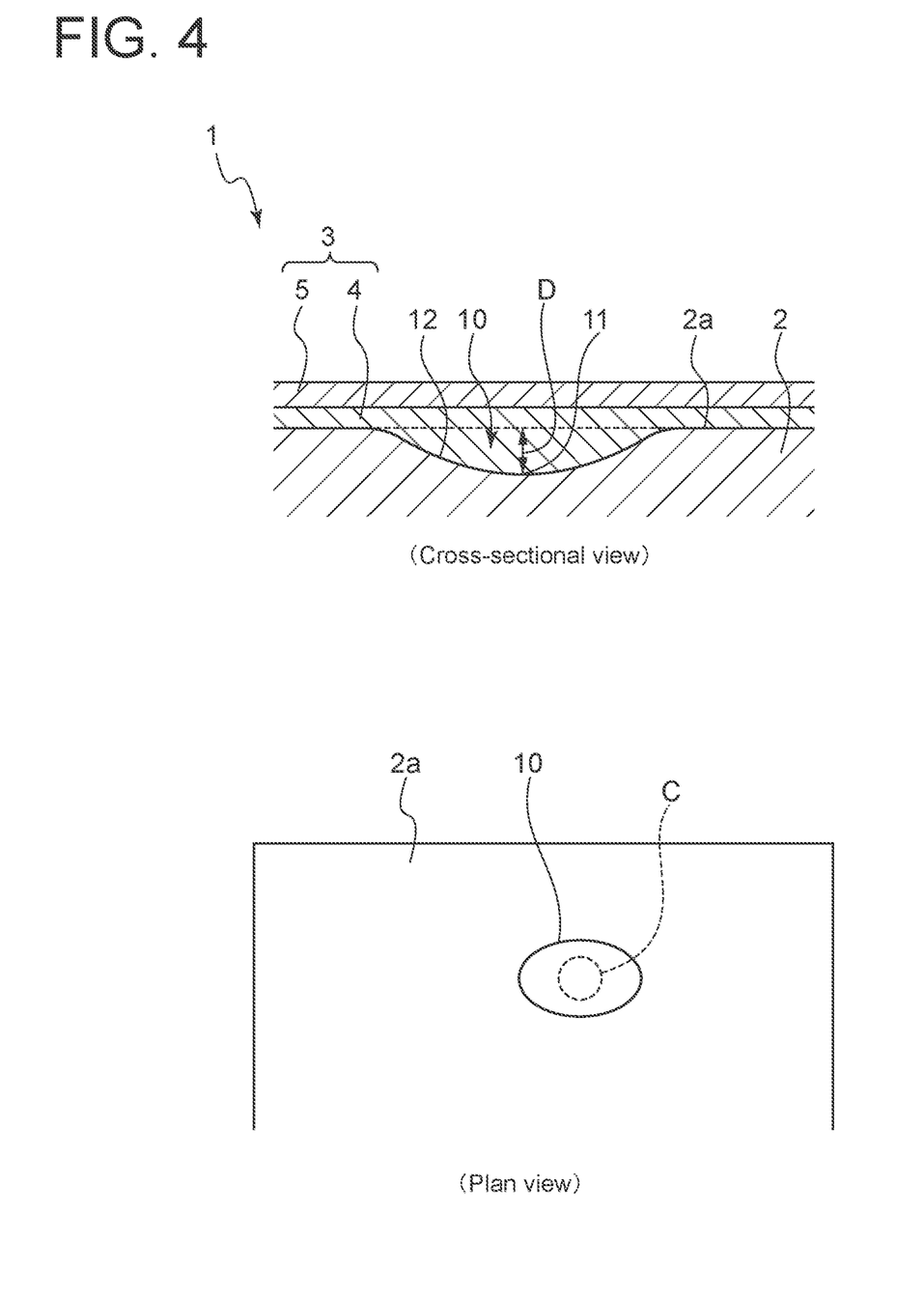
FIG. 4 is a diagram showing a partial configuration of a gas turbine blade from which a base material deterioration layer has been removed by the gas turbine blade repair method according to an embodiment of the present disclosure.

As shown in the cross-sectional view in FIG. 4, the blade 1 from which the base material deterioration layer has been removed by the above-described repair method has a recess 10 that is concave with respect to the surface 2a of the base material 2. The portion where the base material deterioration layer has been removed from the base material 2 corresponds to the recess 10. The depth of the deepest portion 11 of the recess 10 is 20 µm or more. Generally, the surface 2a of the base material 2 is not completely flat, but has microscopic unevenness. However, the recess 10 formed by removing the base material deterioration layer has a clearly deeper concave portion than concave portions of such microscopic unevenness. Therefore, the recess 10 with the deepest portion 11 having a depth D of 20 µm or more is not normally formed on the base material 2 unless the base material deterioration layer has been removed from the blade 1 by the above-described repair method.

In the plan view where the recess 10 is viewed as facing the surface 2a of the base material 2 in FIG. 4, the recess 10 is configured to include a virtual circle C having a diameter of 10 mm. Although the base material deterioration layer usually has an irregular shape, we do not remove the base material deterioration layer along the shape of the base material deterioration layer, but remove a circular or oval or similar shape area that contains the entire base material deterioration layer. Accordingly, the recess 10 is formed in a size such that it can include the virtual circle C having a diameter of 10 mm with respect to the surface 2a. As a matter of course, there is no base material deterioration layer on the surface 12 of the recess 10. In FIG. 4, only one recess 10 is formed on the base material 2, but two or more recesses 10 may be formed depending on the removal work of the base material deterioration layer.

Thus, by etching the base material 2 exposed by removing the thermal barrier coating 3, the base material deterioration layer such as nitride layer or altered layer can be reliably identified, so that the base material deterioration layer formed on the base material 2 can be appropriately removed.

Figure 5:
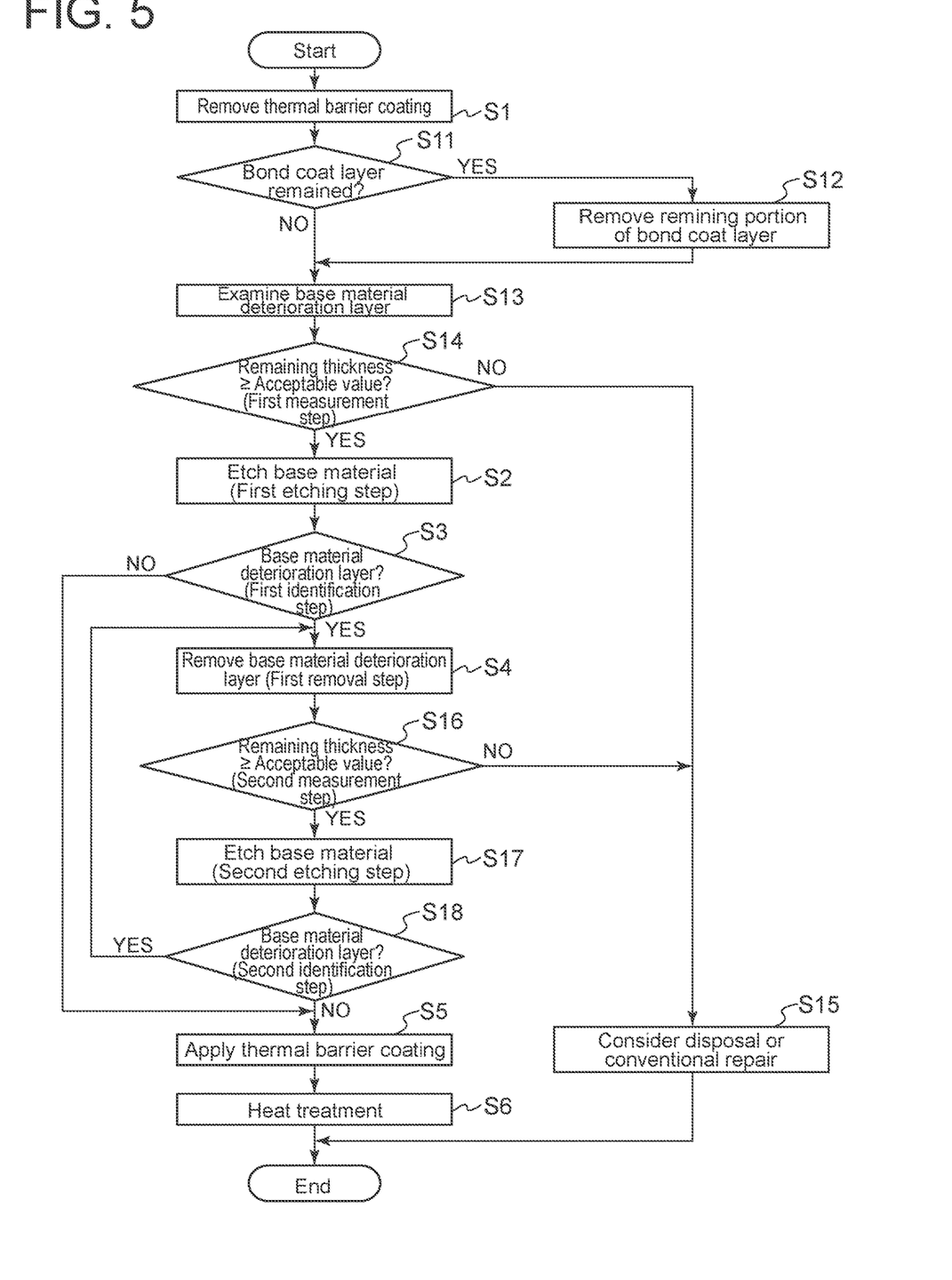
FIG. 5 is a flowchart of the gas turbine blade repair method according to another embodiment of the present disclosure.

FIG. 5 is a flowchart of the gas turbine blade repair method according to another embodiment of the present disclosure. In this embodiment, the same steps as those shown in the flowchart of FIG. 2 are marked with the same step number, and detailed explanations of those steps are omitted in the following description.

In the other embodiment shown in the flowchart of FIG. 5, after step S1, a low-temperature heat treatment may be performed to check whether the bond coat layer 4 remains on the surface 2a of the base material 2 (step S11). In this step, for example, heat tinting is performed for check. If the remaining bond coat layer 4 is confirmed, the remaining portion may be removed by grinding it with a grinder, for example (step S12).

If the remaining bond coat layer 4 is not confirmed in step S11, or after the completion of step S12, the base material deterioration layer in the base material 2 may be examined by X-ray fluorescence (step S13). With this step, the presence or absence of the base material deterioration layer can be checked. The use of X-ray fluorescence to check the presence or absence of the base material deterioration layer is only illustrative, and other methods may be used as long as the presence or absence of the base material deterioration layer can be checked.

After the completion of step S13, the remaining thickness of the base material 2 may be measured by ultrasonic waves (step S14: first measurement step). The measurement of the remaining thickness of the base material 2 is not limited to ultrasonic waves, but may be measured by other known methods. In step S14, the measured remaining thickness is compared with a preset acceptable value. If the measured remaining thickness is equal to or greater than the acceptable value, the process moves to step S2.

Conversely, if the measured remaining thickness is smaller than the acceptable value, it is considered whether the blade 1 should be disposed of or conventional repair methods such as hollowing out should be performed (step S15). If the remaining thickness is less than the acceptable value, a situation may arise where the subsequent steps cannot be performed while the base material deterioration layer is being removed. In contrast, by measuring the remaining thickness, it is possible to determine in advance whether each step can be performed, thus preventing waste of repair.

The operation of moving to step S3 following step S2 and moving to step S4 depending on the determination result in step S3, or skipping step S4 and performing steps S5 and S6, is the same as the embodiment shown in the flowchart of FIG. 2. On the other hand, in this embodiment, after the completion of step S4, the remaining thickness of the base material 2 may be measured by ultrasonic waves (step S16: second measurement step). The measurement of the remaining thickness in step S16 is not limited to ultrasonic waves, but may be measured by other known methods, as in step S14.

In step S16, the measured remaining thickness is compared with a preset acceptable value. If the measured remaining thickness is equal to or greater than the acceptable value, the surface 2a is etched (step S17: second etching step). The method of etching the surface 2a in the second etching step is also not limited, and the same method as in the first etching step may be used, or another known method may be used. If the measured remaining thickness is smaller than the acceptable value, the process moves to step S15. In this case, as in step S14, it is possible to prevent waste of repair.

Then, the base material deterioration layer is identified from the base material 2 etched in step S17 (step S18: second identification step). If it is determined in step S18 that no base material deterioration layer is formed, the process moves to step S5. The operation after step S5 is the same as the embodiment shown in the flowchart of FIG. 2. Conversely, if it is determined in step S17 that the base material deterioration layer is formed, the process returns to step S4. The operation of steps S4 and S16 to S18 may be repeated two or more times until the base material deterioration layer is completely removed. Thus, the base material deterioration layer can be reliably removed.

In the other embodiment shown in the flowchart of FIG. 6, it is not necessary to perform all of the steps S11 to S18 added to the embodiment shown in the flowchart of FIG. 2. Only some of steps S11 to S18 may be performed.

REFERENCE SIGNS LIST

1 Blade
2 Base material
2a Surface (of base material)
3 Thermal barrier coating
4 Bond coat layer
5 Top coat layer
10 Recess
11 Deepest portion (of recess)
12 Surface (of recess)
A Shaded portion (Portion where base material deterioration layer is formed)
C Virtual circle
D Depth (of deepest portion of recess)

The invention claimed is:

1. A repair method for a gas turbine blade, the method comprising:
a step of removing a thermal barrier coating to expose at least part of a base material of the gas turbine blade;
a first etching step of etching the exposed base material;
a first identification step of identifying a base material deterioration layer that is harder than the base material from the etched base material;
a first removal step of removing the identified base material deterioration layer if the base material deterioration layer is identified in the first identification step;
a step of applying a thermal barrier coating to the exposed base material after it is determined that there is no base material deterioration layer in the first identification step, or after the base material deterioration layer is removed in the first removal step;
after the first removal step, repeating at least once:
a second etching step of etching the base material from which the base material deterioration layer has been removed;
a second identification step of identifying the base material deterioration layer from the etched base material caused by the second etching step; and a second removal step of removing the identified base material deterioration layer if the base material deterioration layer is identified in the second identification step, wherein in the first identification step, the base material deterioration layer is identified based on a difference between a color appearing on a portion where the base material deterioration layer is formed and a color appearing on a portion where the base material deterioration layer is not formed.

2. The repair method for a gas turbine blade according to claim 1, further comprising, after the step of removing the thermal barrier coating, a first measurement step of measuring a remaining thickness of the exposed base material, wherein the first etching step is performed if the remaining thickness measured in the first measurement step is equal to or greater than a preset acceptable value.

3. The repair method for a gas turbine blade according to claim 1, further comprising, before the second etching step, a second measurement step of measuring a remaining thickness of the base material from which the base material deterioration layer has been removed, wherein the second etching step is performed if the remaining thickness measured in the second measurement step is equal to or greater than a preset acceptable value.

4. The repair method for a gas turbine blade according to claim 1, further comprising, after the step of removing the thermal barrier coating, a step of examining a base material deterioration layer in the base material by X-ray fluorescence.

5. A repair method for a gas turbine blade, the method comprising:

a step of removing a thermal barrier coating to expose at least part of a base material of the gas turbine blade;

a first etching step of etching the exposed base material;

a first identification step of identifying a base material deterioration layer that is harder than the base material from the etched base material;

a first removal step of removing the identified base material deterioration layer if the base material deterioration layer is identified in the first identification step;

a step of applying a thermal barrier coating to the exposed base material after it is determined that there is no base material deterioration layer in the first identification step, or after the base material deterioration layer is removed in the first removal step; and after the first removal step, repeating at least once:

a second etching step of etching the base material from which the base material deterioration layer has been removed;

a second identification step of identifying the base material deterioration layer from the etched base material caused by the second etching step; and a second removal step of removing the identified base material deterioration layer if the base material deterioration layer is identified in the second identification step.

6. The repair method for a gas turbine blade according to claim 5, further comprising, before the second etching step, a second measurement step of measuring a remaining thickness of the base material from which the base material deterioration layer has been removed, wherein the second etching step is performed if the remaining thickness measured in the second measurement step is equal to or greater than a preset acceptable value.

* * * * *